(12) United States Patent
Ruppert et al.

(10) Patent No.: US 11,085,867 B1
(45) Date of Patent: Aug. 10, 2021

(54) KIT, APPARATUS, AND METHOD FOR DETECTING PERMEATION OF CONTAMINANTS THROUGH PROTECTIVE MATERIALS

(71) Applicant: Combat Capabilities Development Command, Chemical Biological Center, APG, MD (US)

(72) Inventors: Christopher J Ruppert, Havre de Grace, MD (US); Christopher B. Steinbach, Havre de Grace, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 222 days.

(21) Appl. No.: 16/412,790

(22) Filed: May 15, 2019

(51) Int. Cl.
  *G01N 15/08* (2006.01)

(52) U.S. Cl.
  CPC ....... *G01N 15/0806* (2013.01); *G01N 15/082* (2013.01)

(58) Field of Classification Search
  CPC .................... G01N 15/0806; G01N 15/082
  USPC .............................................. 73/38
  See application file for complete search history.

*Primary Examiner* — John Fitzgerald
*Assistant Examiner* — Rodney T Frank
(74) *Attorney, Agent, or Firm* — Ulysses John Biffoni

(57) ABSTRACT

A kit is provided that includes a protective material having opposite first and second surfaces, a contaminant for application to the first surface of the protective material, a sorbent pad for placement in contact with the second surface of the protective material, and a multi-point pin technology (MPPT) device configured to press the protective material against the sorbent pad in order to permit the sorbent pad to detect any permeation of the contaminant through the protective material. The MPPT device includes at least one plate having a plurality of apertures, and pins inserted in and slidably displaceable along the apertures independently of one another to press the protective material against the sorbent pad. Also provided are an apparatus made from the kit and methods of using the kit and apparatus.

24 Claims, 5 Drawing Sheets

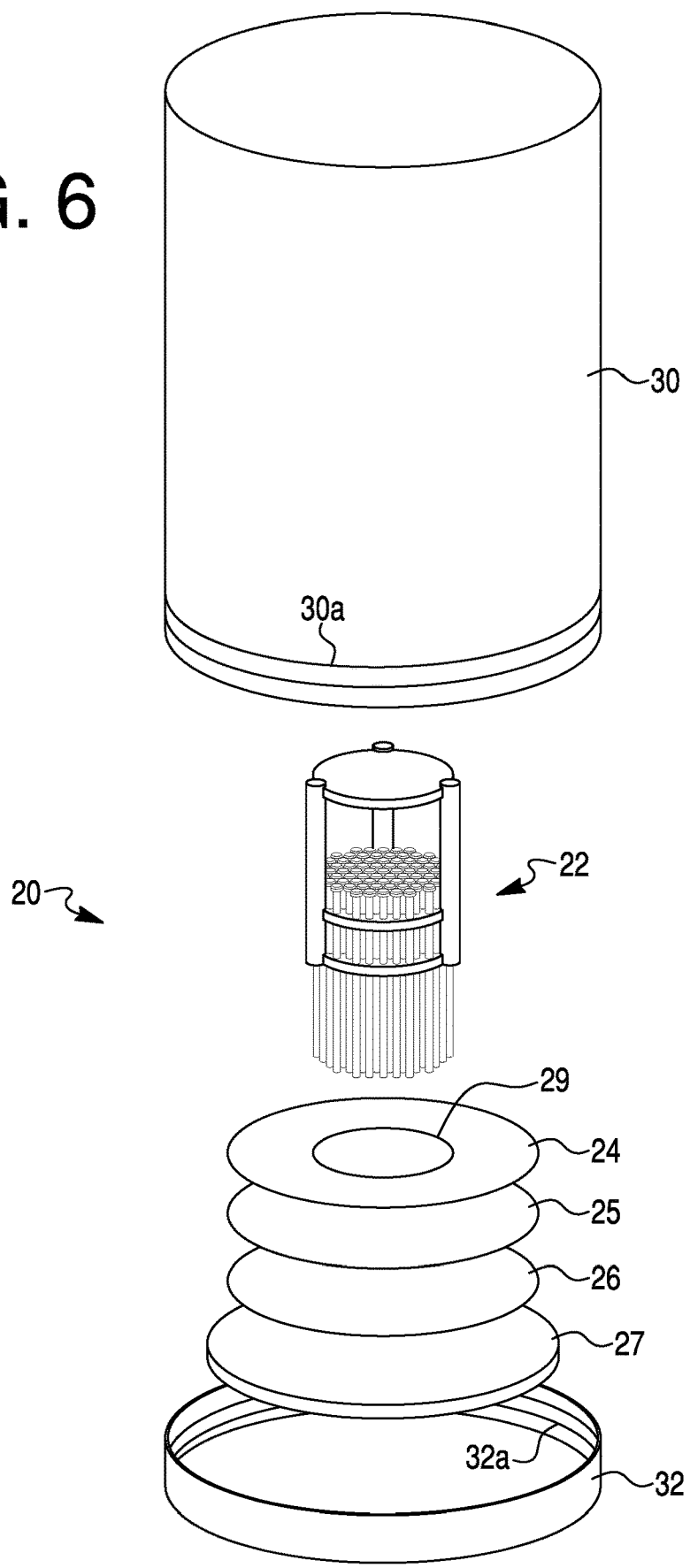

KIT, APPARATUS, AND METHOD FOR DETECTING PERMEATION OF CONTAMINANTS THROUGH PROTECTIVE MATERIALS

STATEMENT OF GOVERNMENT INTEREST

The invention described herein may be manufactured, used, and/or licensed by or for the United States Government.

BACKGROUND

Technical Field

The embodiments described herein generally relate to permeation testing of contaminants for protective materials and equipment, especially personal protective equipment (PPE) against Chemical Warfare Agents (CWAs). In particular embodiments, the invention relates to kits, apparatus, and methods for permeation testing of contaminants for protective materials and equipment, especially PPE against CWAs.

Description of the Related Art

Multiple methods exist for detecting and measuring permeation through protective equipment. According to the U.S. Army Test Operating Procedure (TOP), the suggested method depends on the physical state of the contaminant and the detection method. For liquid-contamination-vapor detection, the suggested method was the Aerosol Vapor Liquid Assessment Group (AVLAG) test cell. This test cell uses a vapor detection scheme with an air sweep under a test swatch to gather the vapor of the contaminant compounds. Detection may utilize MINICAMS® monitoring systems (available from OI Analytical, Texas, USA), sorbent tubes, or bubblers to collect the vapor. A schematic of the AVLAG test cell, as described in the TOP, is illustrated in FIGS. 1A (sealed configuration) and 1B (unassembled configuration) of U.S. Pat. No. 9,594,010. This AVLAG test cell method permits time-resolved quantification of vapor breakthrough through protective materials and environmental control during testing. However, this AVLAG test cell method allows for the quantification of the vapor phase only, requires the use of flat swatches, and generally requires a cumbersome setup. Accordingly, this AVLAG test cell method requires a relatively significant investment in infrastructure for proper operation.

For liquid-contamination-liquid-detection, the TOP suggests using a low volatility agent permeation (LVAP) test method or an expulsion method. The LVAP test method brought forth significant advancement in test capability to evaluate the permeation of low volatility agents by creating uniform contact between the material being tested and a sorbent pad beneath. A schematic of the LVAP test device 10 is illustrated in FIG. 1. Here, 1 psi of pressure is applied to a contaminated swatch 14 of material being tested with a 1 pound stainless steel weight 12 having a 1 inch contact area. A sorbent collection media/pad 16 is positioned below the sample swatch 14 being tested to collect any chemical agent permeation. However, this method can be problematic because the weight 12 cannot apply uniform pressure across an uneven surface, as shown in FIG. 2. Rather, an air gap forms between the bottom of the weight 12 and the sorbent pad 16, such that the weight 12 does not sit flush on the contaminated swatch 14. Therefore, there is a variable level of force applied by the weight 12 to the swatch 14. Without adequate and uniform contact between the sample swatch 14 and the collection media pad 16, an adequate representation of the material performance cannot be achieved. In practice this problem arises, for example, in connection with non-flat swatches taken from fingers of gloves, and seams in or folded portions of protective suits.

The need for a reliable test method has been demonstrated toxicologically with rabbits during a separate study. The rabbit study used a latex swatch, known to be permeable to the nerve agent VX (O-ethyl S-[2-ethyl] methylphosphonothioate), as the swatch test material. The swatch was either in direct contact with the rabbit skin or elevated by 1 cm off the skin. The elevated scenario represented a vapor-only condition for exposure. The same conditions were used in both cases with regard to skin condition, contamination density, contact time, and test material. Data collected included onset of toxic signs, time-resolved acetyl cholinesterase (AChE) enzymatic activity level, and quantitation of regenerated VX in the skin and blood. All rabbits in the direct-contact scenario died, while no signs to mild signs were observed in the vapor-only rabbits. The exposure level is further supported by AChE activities. Furthermore, the level of agent measured in the skin was several orders of magnitude greater for the rabbits in the direct-contact configuration. This further illustrated the requirement for containing adequate contact between the sample and the collection media.

Given that gloves and other personal protective equipment (PPE) are in direct contact with the skin, there is a need for systems and methods that enable reliable testing of PPE materials having uneven surfaces against chemicals, especially CWAs, preferably at high throughput, low operating cost, a reduction in variability, and optionally with quantification.

SUMMARY

A first embodiment of the present invention provides a kit for detecting permeation of contaminants. The kit includes at least a protective material having opposite first and second surfaces, a contaminant for application (directly or indirectly) on the first surface of the protective material, a sorbent pad for placement in contact with the second surface of the protective material, and a multi-point pin technology (MPPT) device configured to press the protective material against the sorbent pad in order to permit the sorbent pad to be used to detect permeation of the contaminant through the protective material. The MPPT device includes at least a plate including a plurality of apertures, and pins inserted in and slidably displaceable along the apertures independently of one another to press the protective material against the sorbent pad.

A second embodiment of the present invention provides an apparatus for detecting permeation of contaminants. The apparatus includes at least a protective material having opposite first and second surfaces, a sorbent pad in contact with the second surface of the protective material, and a multi-point pin technology (MPPT) device configured to press the protective material against the sorbent pad in order to permit the sorbent pad to be used to detect permeation of the contaminant through the protective material. The MPPT device includes at least a plate including a plurality of apertures, and pins inserted in and slidably displaceable along the apertures independently of one another to press the protective material against the sorbent pad. A contaminant is applied to the first surface of the protective material when the apparatus is being used to detect permeation of the contaminant.

A third embodiment of the present invention provides a method for detecting permeation of contaminants. The method includes at least the steps of applying a contaminant to a first surface of a protective material, placing a sorbent pad in contact with an opposite second surface of the protective material, and placing a multi-point pin technology (MPPT) device on the protective material to press the protective material against the sorbent pad in order to permit the sorbent pad to be used to detect permeation of the contaminant through the protective material. The MPPT device includes at least a plate including a plurality of apertures, and pins inserted in and slidably displaceable along the apertures independently of one another to press the protective material against the sorbent pad.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not necessarily of limitation. Many changes and modifications may be made within the scope of the embodiments herein without departing from the spirit thereof, and the embodiments herein include all such modifications.

Other aspects of the invention, including apparatus, instruments, devices, indicators, kits, processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings:

FIG. 6 illustrates an embodiment of an apparatus including the MPPT device of FIGS. 3 through 5.

DETAILED DESCRIPTION OF THE EXEMPLARY EMBODIMENTS AND EXEMPLARY METHODS

Figure 1:
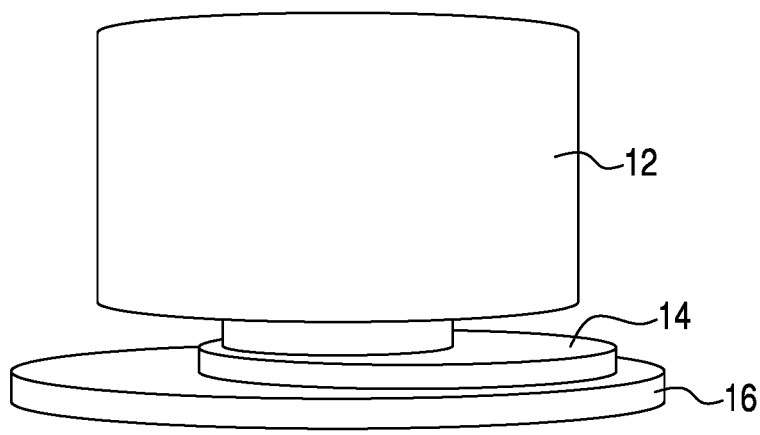
FIG. 1 illustrates a schematic diagram of a conventional expulsion test device applied against an even and uniform personal protective equipment swatch.
Figure 2:
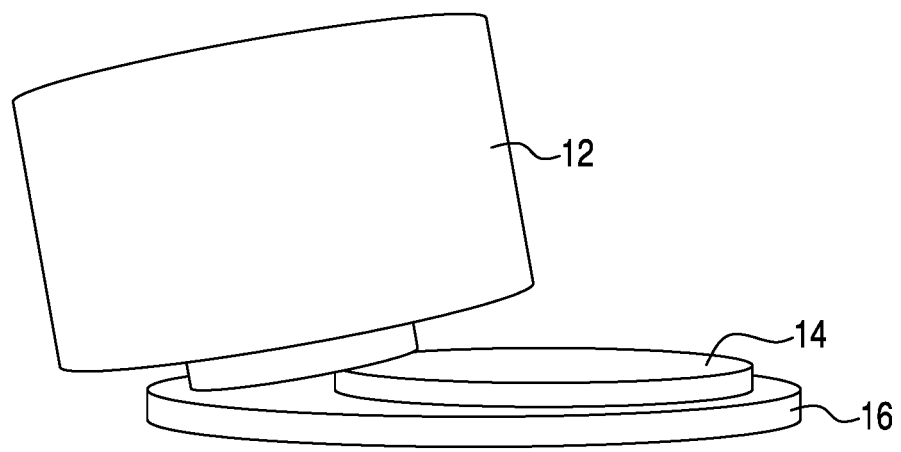
FIG. 2 illustrates a schematic diagram of the conventional expulsion test device of FIG. 1 applied in a non-flush manner against an uneven personal protective equipment swatch.

The exemplary embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not necessarily be construed as limiting the scope of the invention.

The exemplary embodiments herein provide test kits, apparatus, and methods to detect permeation of contaminants through protective materials, in particular, protective materials having non-flat surfaces such as gloves. The test kits, apparatus, and methods increase the confidence of permeation test results, and optionally quantitative permeation test results, for the contaminants, while increasing throughput and reducing operational testing costs. The kits, apparatus, and methods can also be used to evaluate PPE (e.g., gloves) performance under conditions that reflect more realistic use/environmental scenarios, such as non-uniform or uneven surface of PPE.

Referring now to the drawings, and more particularly to FIGS. 3 through 6, where similar reference characters denote corresponding features consistently throughout the figures, there are shown exemplary embodiments.

A schematic of a test cell 20 used in accordance with exemplary embodiments described herein is shown in FIG. 6. The test cell 20 includes a multi-point pin technology (MPPT) device 22, described in further detail below with reference to FIGS. 3-5. The MPPT device 22 is placed above, e.g., on an upper surface of, a contaminated region 29 centered on a swatch 24 of a protective material. The swatch 24 may be a sample cut from or otherwise obtained from personal protective equipment (PPE). The swatches 24 may be cut with an approximately 1 and $^{15}/_{16}$ inch steel ruled die and press. For the butyl gloves, an equal number of swatches 24 may be taken from the palm, middle finger, thumb, and back of the hand. For latex, the swatches 24 may be cut from a bulk roll of latex sheeting.

The protective material used for the swatch 24 preferably is an air impermeable material. In the embodiment shown in FIG. 6, the MPPT device 22 comes into direct contact with the contaminated region 29 of the swatch 24. Alternatively, an intermediate layer or layers, such as a polytetrafluoroethylene (PTFE) layer (not shown), may be interposed between the MPPT device 22 and the contaminated region 29 of the swatch 24.

The contaminant placed on the contaminated region 29 may be a chemical compound that is harmful or lethal to humans, especially as a result of direct skin contact. An example is the nerve agent VX (O-ethyl S-[2-ethyl] methylphosphonothioate). The kits, apparatus, and methods described herein may be used for other contaminants, including, for example, other chemical warfare agents and toxic industrial chemicals (TICs), especially those having volatilities less than or equal to VX.

A sorbent pad 25 is positioned below the swatch 24 opposite to the MPPT device 22. The sorbent pad 25 may be, for example, divinylbenzene (DVB). The sorbent pads 25 may also be latex.

The mass of the MPPT device 22 applied to the swatch 24 forces a constant contact between the swatch 24 and the sorbent pad 25 and exposes the sorbent pad 25 to any contaminant of the contaminated region 29 that permeates through (e.g., via an open seam, cut, tear, hole, or permeation of) the swatch 24. As discussed in greater detail below in connection with FIGS. 3 through 5, the MPPT device 22 sits flushly on and applies force continuously to the contaminated region 29 of the swatch 24 even if the surface is uneven, thereby reducing variability in force applied by the MPPT device 22 across the contaminated area 29. The exposure of the sorbent pad 25 to the contaminated swatch 24 may occur for approximately four hours or any other time period required for the test program. Although designed and tested for swatches comprising air impermeable materials, it is expected that this configuration is applicable to all material types, including air permeable and semi-permeable.

The test cell 20 may further contain a polytetrafluoroethylene (PTFE) layer 26 (e.g., Teflon® material available from DuPont Inc., Delaware, USA). For example, the PTFE layer 26 may be embodied as a disk of 2" diameter. The optional PTFE layer 26 is placed in a holding dish 27, such as a biological-chemical cell culture dish (e.g., Petri dish), for testing, such as uptake efficiency testing as described in U.S. Pat. No. 9,594,010. The holding dish 27 may be made of, for example, polystyrene. The PTFE layer 26 acts as a backstop to prevent contaminant from traveling into the holding (e.g., Petri) dish 27.

The entire cell 20 may be sealed in a sealed/sealable container to provide a testing apparatus. For example, the container include a jar 30, such as a glass jar, having screw threads 30a, and a lid 32, such as a screw cap lid, having screw threads 32a that engage the screw threads 30a of the jar 30. Although the container is embodied as a screw top jar, it should be understood that other containers, especially sealable containers, may be used.

With the exception of the MPPT device 22, which may be made of, for example, stainless steel, the test cell 20 is disposable, thereby reducing the chance of cross-contamination with other equipment.

Referring now more particularly to FIGS. 3-6, the MPPT device 22 includes a cover plate 42, which may be made of a transparent material (e.g., glass or polycarbonate). The MPPT device 22 also includes first (upper) apertured plate 44 and a second (lower) apertured plate 46. The cover plate 42 and the first and second apertured plates 44 and 46 are horizontally oriented in FIGS. 3-6 and parallel to one another. In the illustrated embodiment, the cover plate 42 and the first and second apertured plates 44 and 46 are each circular. However, the plates 42, 44, and 46 may have other shapes, e.g., polygonal. Further, the MPPT device 22 may include fewer or additional plates than shown. For example, the MPPT device 22 can omit the cover plate 42, and/or include one, two, three, four, or more apertured plates.

A plurality of spacers 48, 50, and 52 embodied as cylindrical posts interconnect and retain the cover plate 42 and the first and second apertured plates 44 and 46 in spaced and fixed relation to each other. The spacers 48, 50, and 52 may be secured to the cover plate 42 and the first and second apertured plates 44 and 46 using mechanical fasteners, welding, adhesive, or any other suitable way. The spacers 48, 50, and 52 are circumferentially spaced apart from one another about the peripheries of the plates 42, 44, and 46. The spacers 48, 50, and 52 are embodied in the drawings as rod-shaped support posts, and are three in number. However, the spacers 48, 50, and 52 may have alternative shapes, and may be fewer or more in number than shown.

The first apertured plate 44 includes a plurality of first openings or apertures 44a. Likewise, the second apertured plate 46 includes a plurality of second openings or apertures 46a. Each of the first apertures 44a of the first apertured plate 44 has a longitudinal axis that is aligned with a longitudinal axis of a corresponding second aperture 46a of the second apertured plate 46. The first and second apertured plates 44 and 46 may have fewer or more apertures 44a and 46a than shown. Further, the apertures 44a and 46a are shown having circular shapes, but may have alternative shapes. The apertures 44a and 46a may be arranged in arrays of rows and columns, in staggered rows, or may have randomly dispersed relative to one another.

Figure 3:
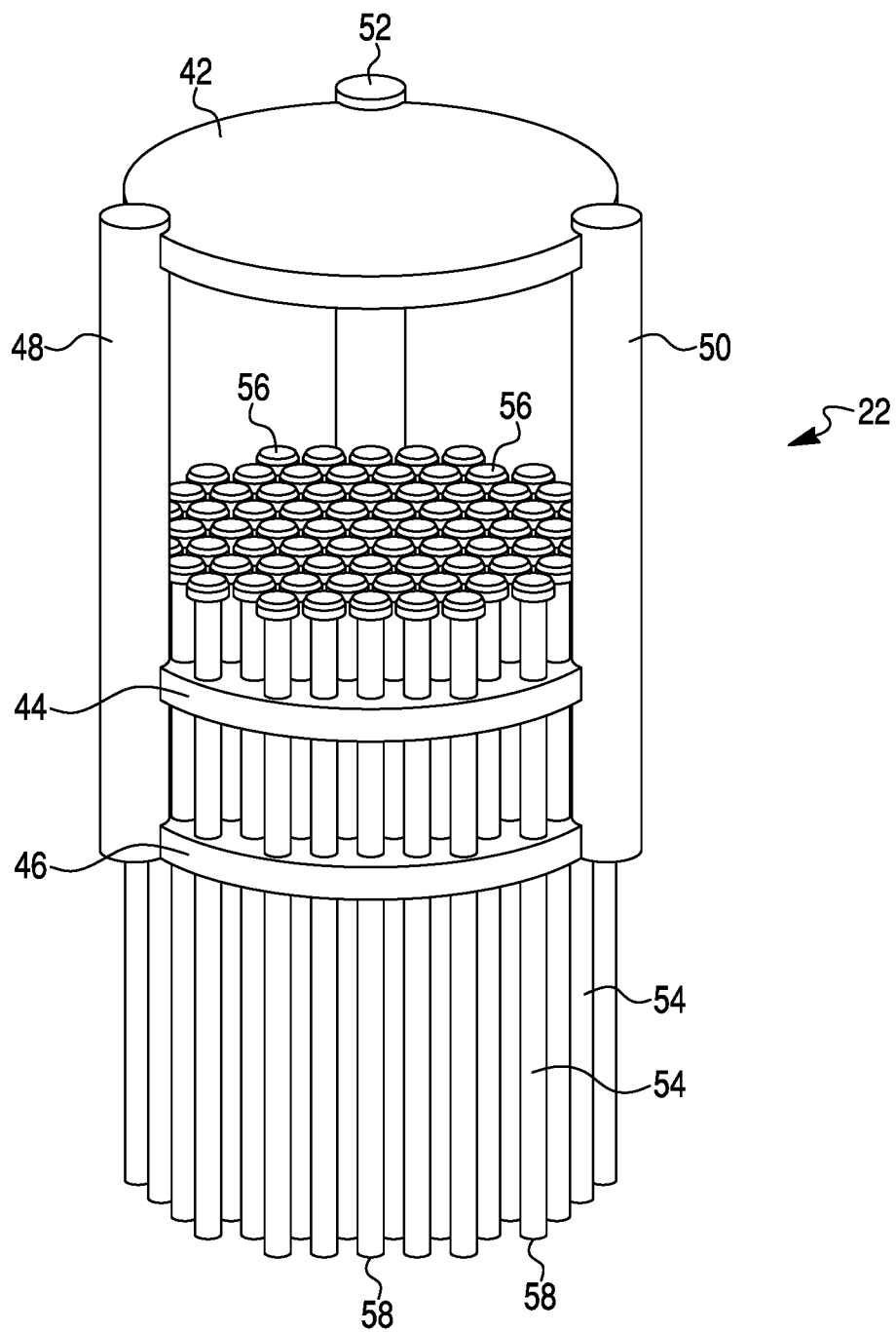
FIG. 3 illustrates a schematic diagram of a multi-point pin technology (MPPT) device according to an exemplary embodiment of the invention.
Figure 4:
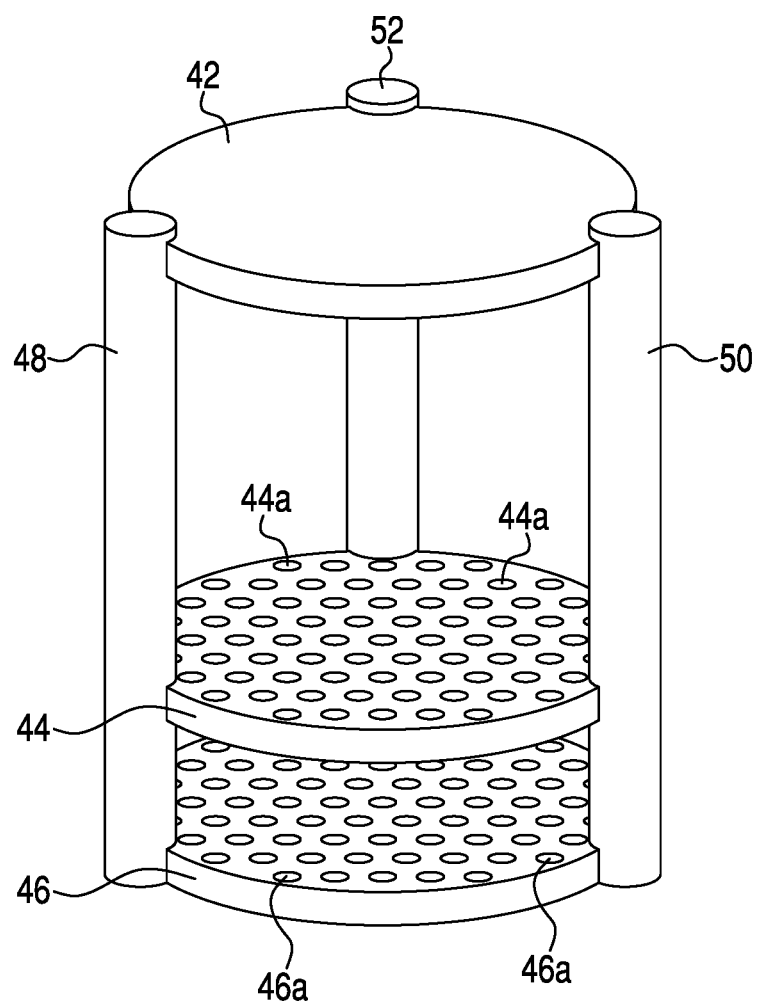
FIG. 4 illustrates a schematic diagram of the MPPT device of FIG. 3 with the pins removed from the MPPT device for explanatory purposes.
Figure 5:
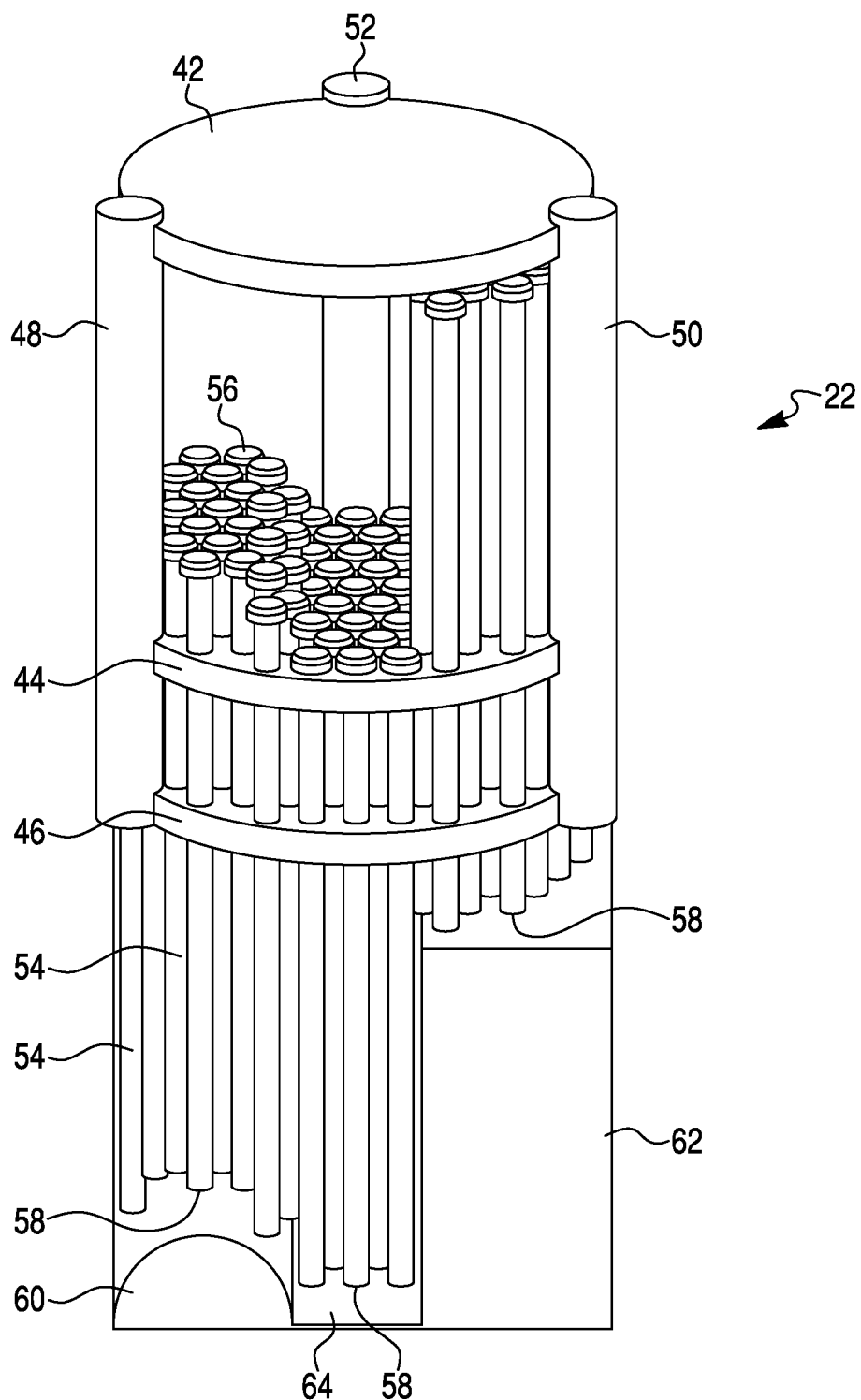
FIG. 5 illustrates a schematic diagram of the MPPT device of FIG. 3 applied to an uneven surface according to an exemplary embodiment of the invention.

The MPPT device 22 further includes a plurality of pins 54 identical in shape and mass to one another and extending lengthwise parallel to one another in a vertical direction in FIGS. 3, 5, and 6. Each of the pins 54 has a shank (unnumbered), a top end 56, and a bottom end 58 opposite to the top end 56. Each of the pin shanks is received in and inserted through a pair or set of corresponding first and second apertures 44a and 46a that are aligned with one another. The spacing between the first apertured plate 44 and the second apertured plate 46 is less than the length of the shanks. The cross-sectional shapes of the shanks match the shapes of the apertures 44a and 46a. Preferably, the shanks are sized small enough relative to the apertures 44a and 46a to produce little or no frictional engagement between the pins 54 and the apertures 44a and 46a, so that the mass of the pins 54 causes the pins 54 to freely and independently slide vertically downward within and along their corresponding apertures 44a and 46a until their bottom ends 58 contact and apply force to the contaminated region 29 of the swatch 24.

The top ends 56 of the pins 54 are embodied as heads having diameters larger than the diameters of the shanks and larger than the diameters of the apertures 44a. The heads 56 of the pins 54 limit upward sliding movement of the pins 54 by coming into contact with the bottom of the cover plate 42, which does not have apertures. Because the heads 56 of the pins 54 are greater in diameter than the apertures 44a, the heads 56 limit downward sliding movement of the pins 54 by coming into contact with the upper surface of the first apertured plate 44.

The bottom ends 58 are illustrated as flat surfaces. The flat surfaces of the bottom ends 58 are advantageous towards avoiding damage to the swatch 24 contacted by the bottom ends of the pins 54. Further, the flat surfaces of the bottom ends 58 provide for flusher, more uniform force contact between the pins 54 and the swatch 24. Alternatively, the bottom ends 58 of the pins 54 may be rounded or pointed.

It is envisioned that the MPPT device 22 may have a total weight of, for example, one (1) pound, and that the area encompassed by the bottom ends 58 of the pins 54 (corresponding to the area of the contaminated region 29) is one (1) square inch. Thus, the embodiment applies 1 psi of force to the 1 square inch contact area of the contaminated region 29 of the swatch 24 with a 1-pound MPPT device 22. The applied weight of 1 psi is mandated by the expulsion test in the TOP, and is used during industrial hygiene studies documented in peer-reviewed journals as a "heavy touch". The applied forces are relevant to contacting a contaminated surface or grasping a contaminated object. However, an MPPT device of other dimensions are also possible in permeation detection tests other than LVAP, to achieve, for example, two (2) pounds over two square inches, three (3) pounds over three square inches, etc. Alternatively, applied forces below or above 1 psi can be used, depending upon the particular test requirement, by changing the weight of the MPPT device 22 and/or the contact area.

Gas-tight syringes can be used for agent deposition. For the liquid detection scheme, the contamination may be, for example, approximately 6 µL of neat contaminant, administered as a single droplet in the contaminated region 29 in the center of the swatch 24. Where the contaminated region 29 is defined to be approximately 1.1 in$^2$, the contamination density is approximately 10 μg/cm$^2$, assuming a liquid density of approximately 1.0 g/mL. A range of contamination levels may be administered, dependent on the test requirements. It should be understood that the methods disclosed herein are not limited to the TOP or the above specifications.

According to an exemplary embodiment, the cover plate 42 and the first and second apertured plates 44 and 46 measure 24.4 mm in diameter and 2 mm in thickness, the support posts 48, 50, and 52 measure 4 mm in diameter and 40 mm in height, there is an 8 mm space between the first and second apertured plates 44 and 46, and the pins 54 have shafts measuring 1.6 mm in diameter by 40 mm in length and heads measuring 2.5 mm in diameter by 1 mm in height.

Because the pins 54 are independently movable along their corresponding pairs/sets of aligned apertures 44a and 46a, gravitational forces acting on the pins 54 achieve uniform contact across the contaminated surface 29, even if the surface 29 is uneven. For example, FIG. 5 illustrates, the MPPT device 22 placed on an object, such as a PPE, having a featured (uneven) upper surface that includes a semi-circular portion 60 with an arcing surface of variable height, a rectangular portion 62 having a raised flat surface, and an intermediate portion 64 having a lower flat surface (that is not coplanar with the raised flat surface of the rectangular portion 62). The pins 54 are freely and independently slidable along the apertures 44a and 46a of the first and second apertured plates 44 and 46. Gravitational forces acting on the pins 54 move the pins 54 downward until the bottom ends 58 of the pins 54 come into contact with and apply uniform force across the featured (uneven) surfaces, including the arcing surface of the semi-circular portion 60, the raised flat surface of the rectangular portion 62, and the lower flat surface of the intermediate portion 64.

An embodiment of a method of detecting permeation of contaminants will now be described. According to this embodiment, contaminants are applied to the swatch 24, preferably of PPE, to establish the contaminated region 29. The swatch 24 is placed above (preferably on and adjacent to) the sorbent pad 25. The MPPT device 22 is applied to (in direct or indirect contact with) an upper surface of the swatch 24 to cause the sorbent pad 25 to become exposed to contaminants, if any, permeating the swatch 24.

Optionally, a level of contamination of the sorbent pad 25 exposed to the contaminants permeating the swatch 24 is measured. Also optionally, the PTFE layer 26 may be placed below the sorbent pad 25 opposite to the swatch 24. The method may further comprise placing the MPPT device 22, the swatch 24, the sorbent pad 25, and the optional PTFE layer 26 in a sealed container, such as the jar 30 closed with the lid 32, during exposure of the sorbent pad 25 to the contaminated swatch 24. The exposure of the sorbent pad to the contaminated protective material may occur for approximately four hours, or any other time period required for the test program.

Optionally, multiple quality control steps can be incorporated into the testing to increase the confidence in the data, including a statistical design of experiments approach for test planning, chemical sample purity analysis, verification of deposited mass, sorbent pad uptake efficiency testing, logging of environmental conditions, inclusion of positive control samples, inclusion of negative controls samples, characterizations samples, sorbent pad uptake efficiency testing edge detection, and analytical quality control. The quality controls are described in U.S. Pat. No. 9,594,010, which is incorporated herein by reference. Since vapor detection is not necessarily considered during experimental testing, flow control hardware and infrastructure is not needed, which decreases the overall footprint.

A possibility exists that the contaminant can travel around the edge of the swatch 24, and onto the sorbent pad 25 (rather than via permeation), leading to a false positive or higher level of contamination. This factor (of contamination travelling around the edge of the swatch 24) can be mitigated by the use of characterization samples. For example, characterization samples may use a contaminant impermeable barrier between the swatch 24 and the sorbent pad 25, preventing permeation through the swatch 24 from sorbing into the pad 25. The impermeable barrier may be, for example, a two-inch diameter PTFE disk. When the barrier is used, any contamination identified on the sorbent pad 25 most likely results from contaminants moving around the edges of the swatch 24. Contaminants measured on the characterization samples could be treated as background levels of contamination for the contaminants of interest or swatches that have not yet been tested with the test method. As backgrounds, these levels may be subtracted from the mass measured in the test samples. In addition, invalid samples may be identified with a positive response from a ring of U.S. Army M8 detection paper in between the test swatch 24 and sorbent pad 25.

According to another exemplary embodiment, a ring of colorimetric paper (not shown) may be placed at the edge of the swatch 24 to indicate an invalid sample. According to a further exemplary embodiment, a rubber (e.g., butyl rubber) gasket O-ring (not shown) may be included between the contaminated region 29 and the MMPT device 22 to help isolate the contaminant vapors, and prevent cross-contamination of the sorbent pad 25. The gasket O-ring is sized based on the dimension of the MMPT device 22, allowing the MMPT device 22 to both apply the necessary contact to the contaminated area 29 of the material 24, and to seal the contaminant vapors with the O-ring. Optionally, fabric glue may be used in conjunction with the O-ring to improve the seal. The O-ring gasket may be included or excluded from any of the other embodiments, as desired. Alternatively, the O-ring can be replaced with a cylindrical containment sleeve (not shown) that encapsulates around the MPPT device 22 and traps agent vapor from cross-contaminating.

During testing, environmental control may be achieved using an incubator (not shown), as described in U.S. Pat. No. 9,594,010. For example, the temperature of the incubator can be set to approximately 32° C. for approximately 24 hours, or whatever time is required for the test program, and verified prior to each test. The MMPT device 22 and jar/lid 30, 32 can be allowed to equilibrate for at least 24 hours prior to use in a test. The temperature can be logged every 30 seconds to ensure temperature variance is controlled. In addition, other temperatures may be used, as required for the test program.

The embodiments herein provide an enhanced test method, especially an enhanced LVAP test method. This method is amenable to permeation testing in a liquid contamination-contact detection scheme. Although designed for air impermeable materials, the embodiments herein may also be amenable to air permeable and semi-permeable materials for liquid-contamination-contact detection schemes.

EXPERIMENTATION

The Test Procedures set forth in Part 4.0 of the IPFS Agent Contact Transfer Hazard Test Plan V1.0 (Jun. 11, 2014) of the Permeation and Analytical Solutions Branch (PASB) of the Edgewood Chemical Biological Center in Aberdeen Proving Ground, Maryland may be followed in carrying out testing and methods described herein, although it should be understood that the invention is not limited to those procedures. The Test Procedures are described below.

After the samples have been prepared, a latex coupon will be placed directly onto the swatch. A PTFE disk will be placed on top the latex sampler before a 1 kg MMPT device is applied to the swatch. The latex disk will be allowed to contact the swatch for 15 min. Following the 15 min collection time, the MMPT device will be removed and solvent rinsed with acetone. The PTFE disk will be discarded and the latex disk will be placed into a 60 mL jar containing 20 mLs of the proper extraction solvent. The sampler will be allowed to extract for 30 min before two aliquots are taken and sent for analysis. The swatch will be removed and placed in the appropriate decontamination solution and disposed of using proper procedures.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of exemplary embodiments, those skilled in the art will recognize that the embodiments herein can be practiced with modification within the spirit and scope of the appended claims.

What is claimed is:

1. A kit for detecting permeation of a contaminant through a protective material, comprising:
    a protective material having opposite first and second surfaces;
    a contaminant for application on the first surface of the protective material;
    a sorbent pad for placement in contact with the second surface of the protective material; and
    a multi-point pin technology (MPPT) device configured to press the protective material against the sorbent pad in order to permit the sorbent pad to be used to detect any permeation of the contaminant through the protective material, the MPPT device comprising:
        a plate comprising a plurality of apertures; and
        pins inserted in and slidably displaceable along the apertures independently of one another to press the protective material against the sorbent pad.

2. The kit of claim 1, wherein the protective material comprises a swatch from personal protective equipment.

3. The kit of claim 2, wherein the swatch has an uneven surface.

4. The kit of claim 1, wherein the contaminant is selected from the groups consisting of chemical warfare agents and toxic industrial chemicals.

5. The kit of claim 4, wherein the contaminant comprises (O-ethyl S-[2-ethyl] methylphosphonothioate (VX).

6. The kit of claim 1, wherein:
    the plate and the plurality of apertures comprise a first plate having a plurality of first apertures; and
    further comprises a second plate having a plurality of second apertures, said second plate interconnected to and spaced apart from the first plate, the first apertures of the first plate being aligned with the second apertures of the second plate; and
    said pins are inserted in and slidably displaceable along corresponding pairs of the first and second apertures independently of one another.

7. The kit of claim 1, further comprising a dish and a polytetrafluoroethylene (PTFE) layer receivable in the dish.

8. The kit of claim 1, further comprising a sealable container configured to house the protective material, the sorbent pad, and the MPPT device.

9. An apparatus for detecting permeation of contaminants through a protective material, comprising:
    a protective material having opposite first and second surfaces;
    a sorbent pad in contact with the second surface of the protective material; and
    a multi-point pin technology (MPPT) device configured to press the protective material against the sorbent pad, the MPPT device comprising
        a plate comprising a plurality of apertures; and
        pins inserted in and slidably displaceable along the apertures independently of one another to press the protective material against the sorbent pad.

10. The apparatus of claim 9, wherein the protective material comprises a swatch from personal protective equipment.

11. The apparatus of claim 10, wherein the swatch has an uneven surface.

12. The apparatus of claim 9, wherein a contaminant is disposed on the first surface of the protective material in order to permit the sorbent pad to be used to detect any permeation of the contaminant through the protective material.

13. The apparatus of claim 12, wherein the contaminant is selected from the groups consisting of chemical warfare agents and toxic industrial chemicals.

14. The apparatus of claim 13, wherein the contaminant comprises (O-ethyl S-[2-ethyl] methylphosphonothioate (VX).

15. The apparatus of claim 9, wherein:
    the plate and the plurality of apertures comprise a first plate having a plurality of first apertures; and
    further comprises a second plate having a plurality of second apertures, said second plate interconnected to and spaced apart from the first plate, the first apertures of the first plate being aligned with the second apertures of the second plate; and
    said pins are inserted in and slidably displaceable along corresponding pairs of the first and second apertures independently of one another to press the protective material against the sorbent pad.

16. The apparatus of claim 9, further comprising a dish and a polytetrafluoroethylene (PTFE) layer placed in the dish, the PTFE layer being on an opposite side of the sorbent pad relative to the protective material.

17. The apparatus of claim 9, further comprising a sealable container housing the protective material, the sorbent pad, and the MPPT device.

18. A method for detecting permeation of contaminants through a protective material, comprising:
    applying a contaminant to a first surface of a protective material;
    placing a sorbent pad in contact with an opposite second surface of the protective material; and
    placing a multi-point pin technology (MPPT) device on the protective material to press the protective material against the sorbent pad in order to permit the sorbent pad to be used to detect permeation of the contaminant through the protective material, the MPPT device comprising:
- a plate comprising a plurality of apertures; and
- pins inserted in and slidably displaceable along the apertures independently of one another to press the protective material against the sorbent pad.

19. The method of claim 18, wherein the protective material comprises a swatch from personal protective equipment.

20. The method of claim 19, wherein the swatch has an uneven surface.

21. The method of claim 18, wherein the contaminant is selected from the group consisting of chemical warfare agents and toxic industrial chemicals.

22. The method of claim 21, wherein said contaminant comprises (O-ethyl S-[2-ethyl] methylphosphonothioate (VX).

23. The method of claim 18, wherein:
- the plate and the plurality of apertures comprise a first plate having a plurality of first apertures; and
- further comprises a second plate having a plurality of second apertures, said second plate interconnected to and spaced apart from the first plate, the first apertures of the first plate being aligned with the second apertures of the second plate; and
- said pins are inserted in and slidably displaceable along corresponding pairs of the first and second apertures independently of one another to press the protective material against the sorbent pad.

24. The method of claim 18, further comprising placing the protective material, the sorbent pad, and the MPPT device in a sealable container and sealing the sealable container.

* * * * *